May 21, 1940.  C. A. CAMPBELL  2,201,363
POP VALVE
Filed Aug. 17, 1938
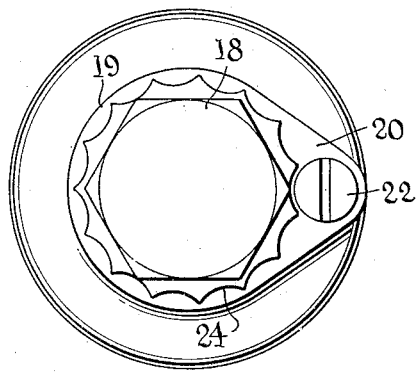
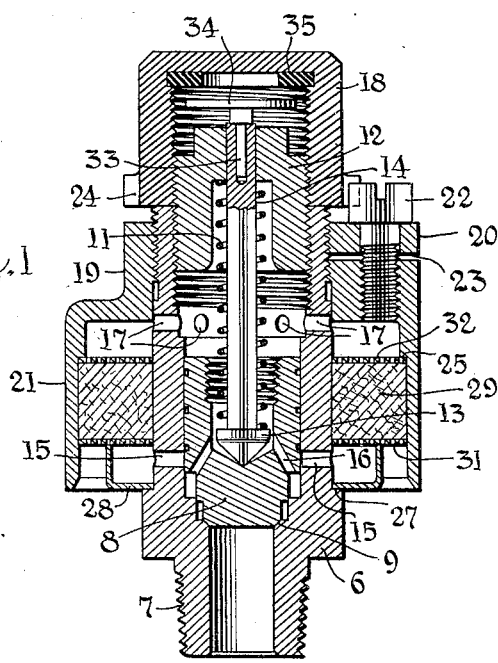
Inventor
Charles A. Campbell
By
Dodge and Son
Attorneys Patented May 21, 1940

2,201,363

UNITED STATES PATENT OFFICE 2,201,363

POP VALVE

Charles A. Campbell, Watertown, N. Y., assignor to The New York Air Brake Company, a corporation of New Jersey Application August 17, 1938, Serial No. 225,477

9 Claims. (Cl. 181—37)

This invention relates to improvements in "pop valves," that is, safety or blow down valves having a sharp opening and closing characteristic.

The invention is particularly designed for use with an improved pop valve described and claimed in the application of Campbell and Safford, Serial No. 162,035, filed September 1, 1937, Patent No. 2,165,611, dated July 11, 1939, and will be illustrated simply for purpose of explanation as applied to a valve of that particular form. No claims are herein made to the construction of the pop valve mechanism per se.

Valves of the type above mentioned are commonly used on passenger brakes and to relieve pressures which often are rather high. The valve opens and closes suddenly and consequently is apt to be noisy, partly because of the sudden blasts of air which it discharges and arrests, and partly because of a hammering action which sometimes occurs when the valve opens.

Such valves are sensitive to derangement by accumulation of dirt or dust in the discharge ports and by the entrance of dust through these ports with an attendant tendency of the valve to stick. There is also a tendency of the acorn nut, which locks the spring seat, to jar loose. Hence considerable difficulty has been encountered in service.

The present invention produces a combined muffler, protecting skirt and port adjusting means, which, together with a buffer for limiting opening movement of the valve stem, secures certainty of action, freedom from clogging, and muffling of the blast and other noises produced by the opening and closing of the valve.

Referring to the accompanying drawing:

Fig. 1 is an axial section through the valve.

Fig. 2 is a view looking at the top or end of the valve of the present invention.

Referring first to Fig. 1, 6 represents the body of the valve which is pipe threaded at 7 for attachment to the port whose discharge is to be controlled. Slidably mounted in the body 6 is the combined valve and piston 8 whose form is clearly shown in the drawing. This valve reciprocates within the body and seats at 9 to produce the desired seal. It is urged toward its seat by a coiled compression spring 11 which reacts at its upper end against an adjustable spring seat 12 threaded in the body 6 and reacts at its lower end against the flange 13 at the lower end of the thrust stem 14. The stress of the spring 11 is adjustable by turning the spring seat 12 which is threaded in the upper end of the body 6. The spring seat also serves as a guide for stem 14.

The main discharge ports in the body are indicated at 15. A row of such ports extends around the valve body. The valve is formed with reaction shoulders as described in the above entitled application and is provided with through ports 16 which lead to the space above, i. e., the space behind the valve. This space is vented to atmosphere by a row of lateral ports 17, which as explained in the prior application, are throttled more or less to control the operative characteristics of the valve, particularly as to rapid opening and closing. Spring seat 12 is locked in position by an acorn nut 18 which screws on the upper end of the spring seat and abuts the upper end of the body 6.

The parts so far described are described in detail and claimed in the prior application and while there are refinements involved in the particular design of the valve and the reaction shoulders, those features are not involved in the present invention and need not be here elaborated.

In the Campbell and Safford valve a throttling ring is threaded on the valve body and may be adjusted to throttle more or less the upper ports. It is locked by a check nut. Instead of using such a ring and check nut, the present invention provides a sleeve 19 with a pendant skirt 21 extending downward from the sleeve to a point below the ports 15. This sleeve may be adjusted on the body 6 to throttle ports 17 more or less, and when adjusted is locked in position by the clamping screw 22 which is threaded into a lug 20 on one side of the sleeve 19 and serves to close a saw kerf 23 and thus lock the sleeve on the threaded body. The head of the screw 22 engages a selected one of a series of flutes 24 formed on the lower margin of the acorn nut 18. Thus the screw 22 locks the sleeve 19 and skirt 21, and at the same time locks the acorn nut 18 so that a single locking means is sufficient to maintain all adjustments.

The skirt 21 has an internal shoulder 25, and the body 6 has an external shoulder 27. This shoulder 27 is usually above the hexagonal wrench grip, formed on the body. Seated on the shoulder 27 is an annular spacer 28, L shaped in cross section and projecting upward through the skirt so that its vertical flange is within, and spaced from, the skirt 21. An annular felt filter ring 29 is confined between two foraminous plates 31 and 32. The lower plate 31 rests on the flange of the spacer 28 and the upper plate is positioned by the shoulder 25 within the skirt 21. Thus the filter is sustained within the skirt above the ports 15 and below the ports 17. It muffles the flow from ports 17 because this flow must pass downward through the filter. It muffles the flow through the ports 15 because this flow must turn upward within the member 28, pass through the filter, and then flow downward between the member 28 and the skirt 21.

The stem 14 is counter-bored at its upper end to receive stem 33 which carries the stop flange 34. The flange 34 is large enough to engage at its margin with an annular rubber buffer 35 which is sprung into an undercut groove within the top of the acorn nut. When the valve pops open sharply, the stop flange 34 will engage the buffer 35 and prevent mechanical noise such as might otherwise result from sudden arrest of the valve stem.

The opening and closing characteristics of the valve are varied by screwing the sleeve 19 up and down on the body. Loading of the valve is adjusted by screwing the spring seat 12 more or less into the body. After the desired adjustments have been made the acorn nut 18 is screwed down to lock the spring seat. Then the screw 22 is inserted in the hole formed in the lug 20 to receive it. Only a slight angular displacement of the sleeve 19 is required to permit the head to enter one of the flutes in the acorn nut 18. Consequently, the acorn nut locks the spring seat and the screw 22 locks the adjusting sleeve and the acorn nut both at once.

In adjusting the sleeve 19 to vary the throttling of the upper ports 17, the felt filter ring 29 is compressed more or less but is of sufficiently yielding character to permit the necessary adjustment.

The proposed construction affords the same facilities for adjustment as was had by the prior art structure with the additional possibility of locking all the adjustments when they are made by the insertion of a single screw. The sleeve 19 with its pendant skirt and the filter structure housed within that skirt protect all the lateral ports in the body 6 from mud, snow and dust. The filter ring 29 muffles discharge and the spring buffer arrests the opening movement of the valve without noisy shock. Thus accurate and quiet operation of the valve is assured at all times. The valve is rendered substantially silent in operation without any impairment of its sharp opening and closing characteristics, because the filter has sufficient capacity to eliminate disturbing back pressure effects.

While a particular and the preferred embodiment of the invention has been described in considerable detail, this is intended to be illustrative rather than limiting. Modifications within the scope of the claims are contemplated.

What is claimed is:

1. In a pop valve, the combination of a body having lateral ports; a valve; a spring for seating said valve; a spring seat adjustably threaded in said body to stress said spring; a jamb nut for locking said seat in adjusted positions; a port throttling member encircling said body and shiftably mounted thereon to throttle variably said lateral ports; clamping means, including a screw for locking the last named member in adjusted positions; and means on the jamb nut engaged by said screw whereby the screw, when set up to lock said throttling member, also locks the jamb nut.

2. The combination defined in claim 1 in which the throttling member is threaded on the body and transversely slotted at one side, and the screw acts to close said slot and thereby lock the member by frictional engagement of the threads.

3. The combination of a pop valve having a body and a spring-seated valve, the body having lateral ports which if throttled affect the operating characteristics of the valve; a member encircling said body and shiftably mounted thereon to throttle variably said ports; means for clamping said encircling member in adjusted positions on said body; a skirt carried by said member, spaced from the body and overlying said ports; and a discharge muffling and dust excluding filter mass mounted in the interval between said skirt and body.

4. The combination of a pop valve having a body and a spring seated valve, the body having two rows of lateral ports, namely, a row of control ports which if throttled vary the operative characteristics of the valve, and a row of discharge ports; a member encircling said body and shiftably mounted thereon to throttle said ports in the desired degree; means for clamping said member in adjusted positions on said body; a skirt carried by said member spaced from the body and overlying both rows of ports; a filter mass mounted between said rows of ports in the interval between said body and skirt; and means constraining discharge from both rows of ports to pass through said filter mass.

5. The combination of a pop valve having a body and a spring-seated valve, the body having two rows of lateral ports, namely, a row of control ports which if throttled vary the operative characteristics of the valve, and a row of discharge ports; a member encircling said body and shiftably mounted thereon to throttle said ports in the desired degree; a skirt carried by said member spaced from the body and overlying both rows of ports; a removable filter element comprising a felt ring and a pair of foraminous confining rings between which the felt ring is interleaved, said element filling the space within said skirt for a portion of the interval between said rows of ports; means comprising a shoulder for sustaining the upper confining ring below the upper row of ports; and a deflector ring supported by the body and arranged to support the lower confining ring above the lower row of ports and to direct discharging fluid through the filter.

6. The combination with the structure of claim 5 of an adjustable seat for the valve spring; a jamb nut for locking said seat; and a single locking means adapted to clamp said encircling member on said body and simultaneously to engage said jamb nut and prevent releasing motion thereof.

7. A pop valve comprising in combination a body; a valve member slidably mounted therein; a spring for urging said valve in a closing direction; a spring seat threaded into the end of said body and adjustable to vary the stress on said spring; a cap nut for locking said spring seat in its adjusted position; a sleeve surrounding said body; means for locking said sleeve to said body; and means, associated with the last named means, for locking said cap nut to said sleeve.

8. A pop valve comprising in combination a body; a valve member slidably mounted therein; a spring for urging said valve in a closing direction; a spring seat threaded into the end of said body and adjustable to vary the stress on said spring; a cap nut for locking said spring seat in its adjusted position; a buffer mounted in said cap nut and arranged to arrest the opening movement of said valve; a sleeve surrounding said body; means for locking said sleeve to said body; and means, associated with the last named means, for locking said cap nut to said sleeve.

9. A pop valve comprising in combination a body; a valve member slidably mounted therein; a spring for urging said valve in a closing direction; a spring seat threaded into the end of said body and adjustable to vary the stress on said spring; a cap nut for locking said spring seat in its adjusted position; a sleeve surrounding said body; means for locking said sleeve to said body; means, associated with the last named means, for locking said cap nut to said sleeve; and a filter body mounted within said sleeve and between the sleeve and the body, said filter being retained by the sleeve and serving to protect the discharge ports of the valve.

CHARLES A. CAMPBELL.